United States Patent Office 3,490,844
Patented Jan. 20, 1970

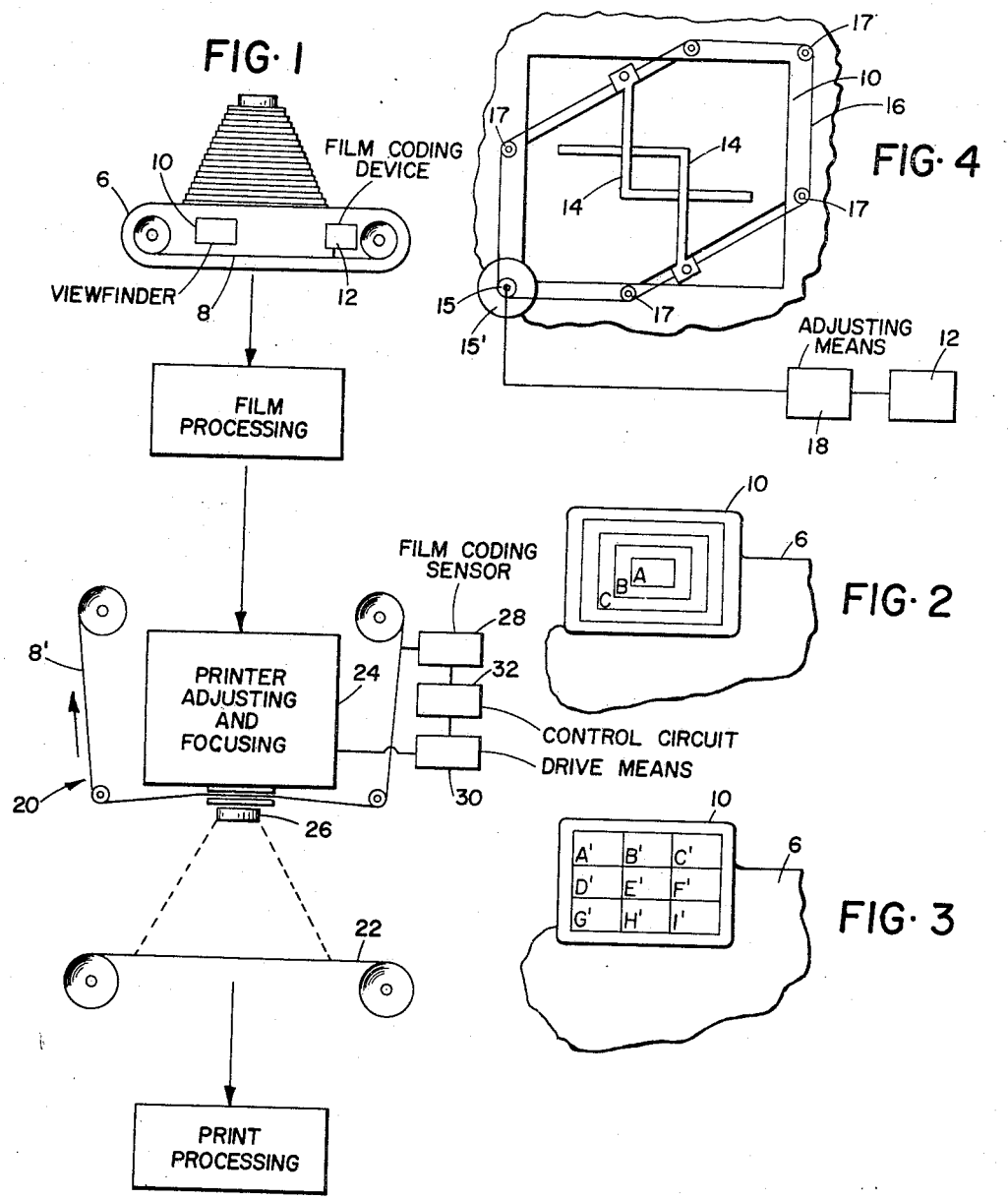

3,490,844
METHOD OF MAKING A PRINT OF A SELECTED PORTION OR ZONE OF A FIELD OF VIEW
Hubert B. Sapp, Jr., Rochester, N.Y., assignor to Eastman Kodak Company, Rochester, N.Y., a corporation of New Jersey
Continuation-in-part of application Ser. No. 335,624, Jan. 3, 1964. This application June 12, 1967, Ser. No. 645,431
Int. Cl. G03b 27/58
U.S. Cl. 355—40     9 Claims

ABSTRACT OF THE DISCLOSURE

A method and apparatus for making a print of a selected portion or zone of a field of view covered in a negative of a film. A signal is encoded on the film as it is being exposed, and after processing the film and during the printing operation in which prints are made of the negatives of the film, the printer adjusting and focusing mechanism is adjusted in response to the signal to produce a print of a predetermined image size and angular coverage from the selected portion or zone of the field of view.

CROSS-REFERENCES TO RELATED APPLICATIONS

This application is a continuation-in-part of U.S. patent application Ser. No. 335,624 by the same inventor, entitled "Method of Making a Photograph of a Selected Field," filed on Jan. 3, 1964, and now abandoned.

BACKGROUND OF THE INVENTION

This invention relates to a method of making a print and apparatus for a selected field of view of a negative, and more particularly to a method of encoding a signal on a film during exposure, and after processing the film and during the printing operation in which prints are made from the processed film, of adjusting the printer adjusting and focusing mechanism in response to the signal to produce a print of a predetermined image size and angular coverage from a selected portion or zone of the field of view covered in a negative.

Currently, cameras may be equipped with lenses of varying angular coverage or field of view, or zoom lenses, which allow the photographer, from a fixed picture taking position to select the angular coverage or zone of the field of view desired for the final picture or print. By field of view, applicant is referring to the portion of the subject area that will appear in the negative. This portion of the subject area is substantially the same as the subject area viewed through the viewfinder by the photographer. Such described lenses tend to be large, heavy, expensive, and difficult to correlate with viewfinder, focusing, and exposure control mechanisms. Zoom lenses also have the disadvantage of limiting angular coverage, and their performance is generally poor. Applicant's invention eliminates the necessity for such special lenses.

SUMMARY OF THE INVENTION

This invention includes within its scope an improved method and apparatus for making a photograph or print of a selected portion of a field of view or subject area by, among other steps, (1) encoding a signal on the film during the exposure operation, indicating the portion of a field of view of which the photograph or print is desired, (2) processing the film to form a plurality of negative images, (3) adjusting and focusing the printer in response to a signal on a negative during the printing operation to produce a photograph or print of only a selected portion of zone of the field of view, and (4) processing the print.

BRIEF DESCRIPTION OF THE DRAWINGS

In the drawings:
FIG. 1 is a schematic view showing the steps of the inventive method;
FIG. 2 is a front elevational view of a viewfinder reticle showing a plurality of centrally located rectangular areas;
FIG. 3 is a view similar to FIG. 2 of a differently arranged viewfinder reticle that could be used in this invention; and
FIG. 4 is a schematic view showing a viewfinder automatically coupled to a film coding device.

DESCRIPTION OF THE PREFERRED EMBODIMENT

The invention will be more clearly understood from the following description considered along with the drawing which shows schematically the steps of the inventive method.

As shown in the drawing, a camera 6 is loaded with a photosensitive film 8 on which may be recorded an image of the field or scene at which the camera is aimed and which is viewed through a viewfinder 10. Film 8 is shown as a strip but can also be in sheet or other form. A film coding device 12 is located adjacent film 10 and is operable by the photographer for encoding a signal on film strip 8 indicating the selected zone of the field of view or image size, or enlargement, or type of print desired, etc. The film coding device 12 may be mechanical and capable of marking indicia on the film in the form of notches, dents, or perforations. The coding device may also be light responsive and form indicia on film strip 8 in the form of a photographic image code. If film strip 8 is provided with a magnetic strip in addition to its photosensitive surface, film coding device 12 may form a magnetic indicia in such strip. Many code forms are well known as suitable for encoded signals on film strip 8. A film coding device of the type which could be employed in this invention is disclosed in the Robertson et al. Patent No. 1,481,272.

Film coding device 12 is operated in conjunction with viewfinder 10 of camera 6 for encoding a signal on the film indicating the portion of the field of view of which a print is desired. A viewfinder reticle or other indicator visible with the field of view can show the photographer the various field angles, areas, or zones selectable or available and thus the subject matter which will appear in the final print. One such reticle is shown in FIG. 2 and shows three possible selectable areas or zones of varying size having a common center, and designated A, B, and C. FIG. 3 shows a different form of reticle in which the selectable areas or zones are arranged adjacent one another, and are designated by the same capital letters primed. The film coding device 12 may be set by the photographer just prior to taking an exposure to encode a signal on film strip 8 when the exposure is made designating the portion or zone of the field of view that the photographer is interested in having a print made. If a film coding device of the type disclosed in the aforementioned U.S. Patent 1,481,272 were used, the photographer would merely have to manually rotate its adjusting knob to the indicia indicating a selected area or zone of the field of view of which a print is desired, and such indicia or other suitable code represented thereby would be encoded on the negative.

Although the described coding system requires the photographer to manually adjust the film coding device, preferably while the subject area is being viewed in the viewfinder and prior to the taking of the exposure, if viewfinder 10 were provided with masking members 14, such as disclosed in FIG. 4, adjustable by a pulley 15 and a cord 16 interconnecting members 14 through idler pulleys 17, the manual operation of film coding device 12 could be eliminated. A suitable mechanical linkage, not shown, could be provided interconnecting pulley 15 to adjusting means 18 of the film coding device 12. The act of the photographer in adjusting the masking members 14 by a knob 15' secured to pulley 15 to center the desired area or zone of the field of view of the subject area of which a print is desired would automatically operate the adjusting means 18 of the film coding device 12 to adjust it to the proper setting to encode this information on the negative.

The film strip 8 bearing a plurality of latent images, each of a field of view of a subject area and having indicated thereon the indicia of the selected zone of the field of view, is then processed to develop the latent images of the field into a plurality of negatives.

The developed film or negatives, shown as 8', are then projection printed in a printer indicated generally by numeral 20. Printer 20 is adjustable for making various enlargements and image sizes on a print receiving medium 22. In the photographic print making art, well known means 24 are available for automatically adjusting and focusing printer 20 for producing an image on medium 22. Examples of such adjusting and focusing means are disclosed in U.S. Patents 2,607,265 and 3,105,410. Printer 20 may preferably be equipped with a zoon lens 26 which can be of good quality and produce excellent results without great expense because a narrow printing angle is possible, and zoom lenses tend to produce better results with narrower field angles.

A film code sensor 28, cooperating with printer 20, senses the code indicia on each negative made by film coding device 12. The mode of sensing or functioning of the film code sensor 28 is determined by the type of code mark formed by film coding device 12. Sensor 28 is coupled by any suitable well known mechanical or electrical means to printer adjusting and focusing means 24 and supplies to the latter the coded indicia or instructions carried by processed film 8'. For instance, sensor 28 could comprise means such as a photoelectric scanner, as disclosed in U.S. Patent Nos. 2,697,962 and 2,947,217, for scanning the coded indicia, and in response thereto, to actuate a drive means 30 such as a solenoid, motor, or the like through a control circuit 32 including photocells or the like, not shown. The drive means 30 could be connected by any suitable linkage means, not shown, to the adjusting and focusing means 24 for controlling it. Although film code sensor 28 is shown schematically in the drawing as sensing the code on the negative before it reaches the printer adjusting and focusing mechanism 24, such code sensor can be located adjacent the optics axis of printer 20 substantially as shown in U.S. Patent 2,697,962. Printer 20 is thereby adjusted according to the indicia on film 8' to make a print of the enlargement desired or the portion of film 8' selected by the photographer, or according to any other instructions encoded on film 8'. Processing the print medium 22 completes the making of a print and produces the final picture.

The method of the invention can be accomplished in the following way. Assume that a photographer who is in the process of taking a picture, mentally notes that he would like an enlarged print of only the center of interest or central zone of the field of view or subject area appearing in the viewfinder of his camera. Such central zone would be represented or centered in the portion of the viewfinder designated A in FIG. 2 or E' in FIG. 3. The photographer would adjust the film coding device 12 by a suitable knob or the like, not shown, so that upon exposure of the film by depression of the camera shutter button, suitable indicia would be encoded on film 8 indicating that it is only the central zone or portion A or E' of the field of view of which a print is desired. Film code sensor 28 can sense the indicia made by the film coding device 12 during the printing operation, and in response thereto can adjust the adjusting and focusing means 24 of printer 20 so that only the central portion or zone A or E' of the image of processed film 8' is printed on medium 22. Since the print produced from the centrally selected portion (zone A or E') of the image is of the same size as a print normally produced from the entire image of the field of view of the negative, the print produced from zone A or E' is relatively enlarged and has a closeup of zoom appearance. Thus the photographer can produce the effect of a telescopic lens or zoom lens without the added expense of purchasing one.

The extra equipment necessary for enabling photographers to enjoy variable field angle photography to make prints of selected portions of the field of view or subject area can thus comprise many relatively simple film coding devices attached to the cameras for every one comparatively complex code sensing and printer adjusting and focusing means for executing the photographer's instructions. The net result economizes in equipment.

The method can be used to produce as many prints, different print sizes, enlargement sizes, and selected image zones as the film coding and sensing device and printer capacity permit. The method can also be used for motion pictures to produce a zoom effect so long as a projection printing step is included. Since the method includes a projection printing step, color balance of the film for various lighting conditions can be corrected in the printing step and the film can thus be limited to a universal type. Also, the film coding device or other specification by the photographer can indicate whether prints, transparencies, or both are desired for a print.

The invention has been described in detail with particular reference to a preferred embodiment thereof, but it will be understood that variations and modifications can be effected within the spirit and scope of the invention as described hereinabove and as defined in the appended claims.

I claim:

1. A method of making a print of a selected portion of a field of view of a negative comprising:
   exposing a photosensitive film to light from a scene to obtain a latent image having a predetermined field of view;
   encoding on said film an indicium designating a selected portion of said field of view of which a print is desired;
   processing said film to obtain a negative of said latent image;
   sensing by means other than visual means said indicium on said processed film during a printing operation; and
   making a print in response to said sensing step of substantially only said selected portion of said field of view of said negative.

2. A method of making a print of a selected portion of a field of view of a negative comprising:
   viewing a subject area in a viewfinder of a photographic camera;
   exposing a photosensitive film in said camera to light from substantially all of said viewed subject area to obtain a latent image on said film corresponding to said viewed subject area;
   encoding on said film an indicium designating a selected portion of said viewed subject area of which a print is desired;
   processing said film to obtain a negative of said latent image;
   sensing by means other than visual means said indicium on said processed film during a printing operation; and
   adjusting a printer adjusting and focusing mechanism in response to said sensing step to make a print of substantially only said selected portion of said field of view of said negative.

3. The inventive method of claim 1 wherein said exposing and encoding steps are performed simultaneously.

4. The inventive method of claim 2 wherein said exposing and encoding steps are performed simultaneously.

5. A method of making a print of a selected portion of a field of view of a negative comprising:
viewing a subject area in a viewfinder of a photographic camera;
noting in said viewfinder a selected portion of the subject area of which a print is desired;
exposing a photosensitive film in said camera to light from substantially all of said viewed subject area to obtain a latent image on said film corresponding to said viewed subject area;
encoding on said film an indicium designating said noted selected portion of said viewed subject area of which a print is desired;
processing said film to obtain a negative of said latent image;
sensing by means other than visual means said indicium on said processed film during a printing operation; and
adjusting a printer adjusting and focusing mechanism in response to said sensing step to make a print of substantially only said selected portion of said field of view of said negative.

6. The inventive method of claim 5 wherein said exposing and encoding steps are performed simultaneously.

7. The inventive method of claim 5 wherein the performance of said noting step selects the indicium to be encoded during said encoding step.

8. In a camera for exposing sucessive frames of a film transported therethrough, the combination comprising:
adjustable film encoding means for encoding a selected one of a plurality of indicia on a film frame when an exposure is made;
a viewfinder having movable masking means for selecting one of a plurality of areas of the field of view of the subject area visible through the viewfinder, each of said areas corresponding to one of said indicia; and
means interconnecting said film encoding means and said masking means whereby movement of said masking means to select one of said areas automatically adjusts said film encoding means for encoding a corresponding one of said indicia on the film frame.

9. The invention according to claim 8 wherein said viewfinder has a reticle defining said plurality of areas, and said masking means are movable into register with a selected one of said areas.

References Cited

UNITED STATES PATENTS

| | | | |
|---|---|---|---|
| 3,315,561 | 4/1967 | Garcia-Boutigue | 355—42 |
| 3,377,914 | 4/1968 | Jeffee | 355—41 |

NORTON ANSHER, Primary Examiner

RICHARD A. WINTERCORN, Assistant Examiner

U.S. Cl. X.R.

95—1.1; 352—53, 85, 91; 355—77